United States Patent [19]

Takamizawa et al.

[11] Patent Number: 5,341,569
[45] Date of Patent: Aug. 30, 1994

[54] PRELOADING METHOD FOR PRELOAD-ADJUSTABLE ROLLING BEARING AND MANUFACTURING METHOD OF THE SAME

[75] Inventors: Toru Takamizawa; Seizo Miyazaki, both of Kanagawa, Japan

[73] Assignee: NSK Ltd., Tokyo, Japan

[21] Appl. No.: 20,533

[22] Filed: Feb. 22, 1993

[30] Foreign Application Priority Data

Feb. 24, 1992 [JP] Japan .................................. 4-072181
Dec. 2, 1992 [JP] Japan .................................. 4-345146
Feb. 10, 1993 [JP] Japan .................................. 5-044383

[51] Int. Cl.$^5$ .............................................. B23P 15/00
[52] U.S. Cl. ........................................ 29/898.09; 29/898
[58] Field of Search ................... 29/898.09, 898, 446; 384/498, 537

[56] References Cited

U.S. PATENT DOCUMENTS

| 3,581,362 | 6/1971 | Turner | 29/898.09 |
|---|---|---|---|
| 3,651,550 | 3/1972 | Bennett | 29/898.09 |
| 4,476,614 | 10/1984 | Pittroff | 29/898.09 |
| 4,713,704 | 12/1987 | Voll et al. | |
| 4,900,958 | 2/1990 | Kitahara et al. | |
| 5,045,738 | 9/1991 | Hishida et al. | |
| 5,144,743 | 9/1992 | Kempas | 29/898.09 |
| 5,206,993 | 5/1993 | Brough | 29/898.09 |

FOREIGN PATENT DOCUMENTS

| 393916 | 2/1939 | Japan . |
|---|---|---|
| 6165913 | 9/1959 | Japan . |
| 50-101753 | 8/1975 | Japan . |
| 57-140912 | 8/1982 | Japan . |
| 6179899 | 9/1984 | Japan . |
| 60-196024 | 12/1985 | Japan . |
| 61-145761 | 7/1986 | Japan . |
| 62-22323 | 2/1987 | Japan . |
| 1266320 | 10/1989 | Japan . |
| 276647 | 3/1990 | Japan . |
| 336517 | 4/1991 | Japan . |
| 351929 | 8/1991 | Japan . |
| 3222661 | 10/1991 | Japan . |

*Primary Examiner*—Irene Cuda
*Attorney, Agent, or Firm*—Wegner, Cantor, Mueller & Player

[57] ABSTRACT

A preload-adjustable bearing is constructed of a first rotary unit and second rotary unit. The first rotary unit has a first race and second race arranged immobile in a direction approaching toward each other. The second rotary unit has a third race and fourth race. The third race is located opposite the first race while the fourth race is located opposite the second race. The third race is fixed relative to the second rotary unit in a direction away from the fourth race. The fourth race is fitted with the second rotary unit with an interference formed therebetween movably relative to the second rotary unit. The fourth race is movable toward the third race under axial pressure applied between the fourth race and the second rotary unit. To preload the bearing, axial pressure is applied between the fourth race and the second rotary unit and then, the third race is moved toward the fourth race while measuring a preload between the first, second, third and fourth races and the first and second rows of balls so that the preload is set at a predetermined value. The bearing can be manufactured by forming at least one race groove in the fourth race after the fitting of the fourth race with the second rotary unit.

17 Claims, 15 Drawing Sheets

PRELOADING METHOD FOR PRELOAD-ADJUSTABLE ROLLING BEARING AND MANUFACTURING METHOD OF THE SAME

BACKGROUND OF THE INVENTION

1) Field of the Invention

The present invention relates to a method for preloading preload-adjustable rolling bearings adapted to be assembled in various precision rotary components, for example, spindle motors, rotary actuators, rotary encoders and the like for video tape recorders (VTR), hard disk drives (HDD) and laser beam printers (LBP) in order to rotatably support their rotating elements. This invention is also concerned with a method for manufacturing such preload-adjustable rolling bearings.

2) Description of the Related Art

A ball bearing is used to rotatably support a spindle of VTR or HDD while preventing whirling (i.e., motions in a direction perpendicular to the spindle) and/or axial deviations. A pair of mutually independent ball bearings (of either the deep groove type or the angular type) have heretofore been employed. With a view toward making efficient the assembly of ball bearings in a rotatably supporting part, use of a double-row ball bearing has also been proposed.

A double-row ball bearing is constructed by concentrically combining a spindle 2, which has a pair of deep inner race groove in an outer peripheral wall thereof as shown in FIG. 12(A), with an outer race 4, which has a pair of deep outer race grooves 3,3 in an inner peripheral wall thereof as depicted in FIG. 12(B), and then rotatably inserting plural balls 5,5 between the inner race grooves 1,1 and the corresponding outer race grooves 3,3 as illustrated in FIG. 12(A). FIG. 12(C) also shows retainers 6,6 for holding the balls 5,5 at equal angular intervals and seals 7,7 for preventing dust and the like from penetrating into the ball-inserted parts.

Although the construction of such a double-row ball bearing as shown in FIG. 12(C) has been known, it has heretofore been difficult to manufacture a double-row ball bearing suitable for use in supporting a spindle in VTR or HDD. This can be attributed to the reasons to be described next.

A ball bearing for use in supporting a spindle in VTR or HDD is required to have extremely high accuracy in order to avoid whirling motions and axial displacements. Therefore, a ball bearing for use in supporting such a spindle is used in a state preloaded in an axial direction.

Upon insertion of the balls 5 between each inner race groove 1 and its corresponding outer race groove 3 to assemble the deep-groove ball bearing, on the other hand, the inner race groove 1 and the outer race groove 3 are brought into an eccentric relationship to widen a radial spacing 8, which extends in a circumferential direction between both the grooves 1 and 3, at a part thereof as illustrated in FIG. 13. From the widened part of the spacing 8, the balls 5,5 are inserted between the inner race groove 1 and the outer race groove 3 as many as desired. Thereafter, the inner race groove 1 and the outer race groove 3 are rendered concentric with each other and the desired number of the balls 5,5 are disposed at equal angular intervals.

To rearrange the plural balls 5,5, which have been inserted together in the widened part of the spacing 8, at equal angular intervals as described above, it is necessary to make the individual balls 5,5 slide on and relative to the inner race groove 1 and the outer race groove 3. If the individual balls 5,5 are strongly pressed by the inner race groove 1 and the outer race groove 3, in other words, are in a preloaded state at this time, rolling surfaces of the inner race groove 1, outer race groove 3 and balls 5,5 are prone to damage. Their damage leads to such a problem such that vibrations may occur during rotation or the durability may be impaired.

In the case of the construction that a pair of single-row deep ball bearings are arranged at an interval as disclosed, for example, in Japanese Patent Application Laid-Open (Kokai) No. SHO 57-200722, on the other hand, each ball bearing is assembled in a state not applied with a preload so that this construction is free of such inconvenience as referred to above. However, the assembly work of the ball bearings is cumbersome.

Further, double-row, deep-groove ball bearings useful in tension pulleys or water pumps are disclosed, for example, in Japanese Patent Application Laid-Open (Kokai) Nos. SHO 61-65913 and SHO 61-79899 and Japanese Utility Model Application Laid-Open (Kokai) Nos. SHO 50-101753 and SHO 56-127456. These bearings are however not require to have very high rotational accuracy and are used in a state not applied with preload. They cannot therefore be used to support spindles in VTR, HDD or the like.

Japanese Patent Application Laid-Open (Kokai) No. SHO 61-145761 discloses a double-row angular ball bearing while Japanese Utility Model Application Laid-Open (Kokai) No. SHO 62-22323 discloses a double-row ball bearing constructed in combination of a deep-groove ball bearing and an angular ball bearing. To assemble an angular ball bearing, it is necessary to heat an outer race as disclosed, for example, in Japanese Utility Model Publication (Kokoku) No. SHO 39-3916 so that the outer race is caused to expand to protect shoulder portions of each groove and/or rolling surfaces of balls when the balls pass along the shoulder portions. The assembly work is therefore irksome.

Japanese Patent Application Laid-Open (Kokai) No. SHO 57-140912 discloses the invention in which after a double-row, deep-groove ball bearing equipped with an outer race formed in combination of a main outer race and a subordinate outer race axially displaceable relative to the main outer race has been assembled in a state not applied with preload, the subordinate outer race is caused to displace axially to apply a predetermined preload and is then fixed by a presser member. It also discloses the invention in which a predetermined preload is applied by axially pressing the subordinate outer race with a spring. The inventions disclosed in this patent publication, however, requires such a presser member or spring. This results in more cumbersome management or control of parts and also in more irksome assembly work. Moreover, the ball bearing may require an unduly large axial length.

U.S. Pat. No. 4,900,958 discloses such constructions as shown in FIGS. 14 and 15, respectively. In the case of the construction depicted in FIG. 14, ball bearings 9,9 of the deep groove type (or of the angular type) are disposed in a pair between an outer peripheral wall of a spindle 2 and an inner peripheral wall of a housing 10, and inner races 11,11 of both the ball bearings 9,9 are pushed in a direction approaching toward each other to apply a preload to balls 5,5 of both the ball bearings 9,9.

Described specifically, an end face of one of the inner races, i.e., of the inner race 11 located on the right-hand side as viewed in FIG. 14 is brought into abutment against a stop ring 12 and the other inner race, i.e., the inner race 11 on the left-hand side as viewed in FIG. 14 is pushed toward the stop ring 12, whereby a preload is applied. The left-hand inner race 11 is fixed on the spindle 2 by an adhesive or shrinkage fitting. It is therefore necessary to continuously push the left-hand inner race 11 toward the stop ring 12 under a load equivalent to the preload until the adhesive solidifies or the left-hand inner race so heated shrinks.

In the case of the construction illustrated in FIG. 15, on the other hand, inner race grooves 1,1 are formed in double rows in an outer peripheral wall of a spindle 2. A spacer 13 is arranged between outer rings 4,4 which are internally fitted in a pair in a housing 10. By the spacer 13, both the outer races 4,4 are pushed in a direction moving away from each other so that a preload is applied to balls 5,5.

Further, Japanese Utility Model Application Laid-Open (Kokai) No. HEI 3-36517 discloses such a construction as shown in FIG. 16. By a leaf spring 14 held between outer races 4,4 arranged in a pair, the outer races 4,4 are both pushed in a direction moving away from each other so that a preload is applied to balls 5,5.

Japanese Patent Application Laid-Open (Kokai) No. HEI 3-222661 and U.S. Pat. No. 5,045,738 disclose such constructions as illustrated in FIGS. 17 and 18, respectively. In the construction of FIG. 17, a preload is applied by pushing with a leaf spring 14 an outer race 4 internally fitted in a housing. In the construction of FIG. 18, on the other hand, an outer race 4 is fixed on the housing 10 by an adhesive or shrinkage fitting while applying a predetermined preload. Of double-row outer race grooves 3,3, one of the outer race groove 3,3 is formed in an inner peripheral wall of the outer race 4 while the other outer race groove 3 is formed in an inner peripheral wall of the housing.

Although illustration by drawings is omitted, Japanese Patent Application Laid-Open (Kokai) No. SHO 61-145761 and U.S. Pat. No. 4,713,704 discloses such a construction that one of double-row inner race grooves is formed in an outer peripheral wall of a spindle, the other inner race groove is formed in an outer peripheral wall of an inner race externally fitted on the spindle, and the inner race is adhered and fixed to the spindle with balls being applied with an appropriate preload.

The above-described constructions of FIGS. 14 to 18 and that disclosed in Japanese Patent Application Laid-Open (Kokai) No. SHO 61-145761 are accompanied not only by the problems that they require cumbersome assembly work and parts management or control as described above but also by the problem that they tend to develop small vibrations. In each of the above-described conventional constructions, each inner race 11 or outer race 4 tends to tilt upon preloading although the extent of the tilting may not be very large, because the inner race 11 is loosely fitted on the spindle 2 (in the case of the construction shown in FIG. 14) or the outer race 4 is loosely fitted in the housing (in the case of the constructions illustrated in FIGS. 15 to 18, respectively). When tilted, the bearing so assembled produces small vibrations during rotation, leading to the potential problem that the performance of HDD or the like with the bearing assembled therein may be reduced.

Further, the work to fix the inner race 11 on the spindle 2 or the outer race 4 on the housing 10 by an adhesive or shrinkage fitting is conducted in a factory where the rolling bearing is manufactured. As a corollary to this, the assembler (user) who purchases the bearing and assembles it in HDD or the like cannot change the preload of the bearing. It is therefore the current circumstance that the bearing is used as purchased without adjustment of its preload even when the assembler wishes to adjust the preload in view of a difference in specification.

To allow HDD or the like to exhibit its best performance, it is preferred to adjust the preload of the bearing in accordance with the manner of its use.

Japanese Patent Application Laid-Open (Kokai) No. HEI 1-266320 discloses a construction which permits adjustment of the preload. Namely, outer races of a rolling bearing are pushed by a piezoelectric actuator in a direction moving away from each other so that a preload is applied to the rolling bearing. The preload is adjustable by controlling a voltage impressed to the piezoelectric actuator. The construction disclosed in this patent publication, however, cannot avoid an overall dimensional increase of the rolling bearing. The rolling bearing so manufactured may be assembled in a large apparatus such as a machine tool, but its assembly in a small apparatus like HDD is difficult.

SUMMARY OF THE INVENTION

An object of the present invention is to improve the performance of various apparatuses, which have a rotatably supporting portion, by improving the accuracy of a preloaded rolling bearing without the need for particularly cumbersome assembly work or parts management or control.

A specific object of the present invention is to provide a preloading method for a preload-adjustable rolling bearing, which method can overcome the problems or inconvenience referred to above.

Another specific object of the present invention is to provide a manufacturing method of such a preload-adjustable rolling bearing, which method can also overcome the problems or inconvenience described above.

In one aspect of the present invention, there is thus provided a method for preloading a first preload-adjustable bearing constructed of a first rotary unit and second rotary unit rotatable relative to each other, said first rotary unit having a first race and second race arranged immobile in a direction approaching toward each other, said second rotary unit having a third race and fourth race, said third race being located opposite said first race of said first rotary unit with a first row of balls interposed therebetween, said fourth race being located opposite said second race of said first rotary unit with a second row of balls interposed therebetween, said third race being immobile relative to said second rotary unit in a direction away from said fourth race, said fourth race being fitted with said second rotary unit with an interference formed therebetween movably relative to said second rotary unit, and said fourth race being movable toward said third race under axial pressure applied between said fourth race and said second rotary unit, which method comprises:

applying axial pressure between said fourth race and said second rotary unit; and moving said third race toward said fourth race while measuring by preload measuring means a preload between said first, second, third and fourth races and said first and second rows of balls;

whereby said preload is set at a predetermined value.

In another aspect of the present invention, there is also provided a method for preloading a second preload-adjustable bearing constructed of a first rotary unit and second rotary unit rotatable relative to each other, said first rotary unit having a first race and second race arranged immobile in a direction approaching toward each other, said second rotary unit having a third race and fourth race, said third race being located opposite said first race of said first rotary unit with a first row of balls interposed therebetween, said fourth race being located opposite said second race of said first rotary unit with a second row of balls interposed therebetween, said third race and fourth race being fitted with said second rotary unit with an interference formed therebetween movably relative to said second rotary unit, and said third race and said fourth race being movable toward each other under axial pressure applied between said third race and said fourth race, which method comprises:

applying axial pressure between said third race and said fourth race; and moving said third and force races toward each other while measuring by preload measuring means a preload between said first, second, third and fourth races and said first and second rows of balls;

whereby said preload is set at a predetermined value.

In a further aspect of the present invention, there is also provided a method for manufacturing the first preload-adjustable bearing, which method comprises:

forming at least one race groove in said fourth groove subsequent to the fitting of said fourth race with said second rotary unit.

In a still further aspect of the present invention, there is also provided a method for manufacturing the second preload-adjustable bearing, which method comprises:

forming at least one race groove in each of said third and fourth races subsequent to the fitting of said third and fourth races with said second rotary unit.

The above-described preloading methods and manufacturing methods according to the present invention permit the assembly of a rolling bearing without damaging ball rolling surfaces, the double-row inner race grooves and the double-row outer race grooves while making it possible to apply an axial preload to each ball. The assembly work of the rolling bearing is therefore simple and easy. The preloaded rolling bearing can be manufactured at low cost with small dimensions while making it possible to achieve high-accuracy support for rotation. Owing to the avoidance of damage during its manufacture, the rolling bearing so manufactured can exhibit high performance, durability and reliability.

Since the second rotary unit and the fourth race are fitted together with an interference formed therebetween movably relative to the second rotary unit, the fourth race is not caused to tilt upon preloading and moreover, is displaceable upon application of an axial force greater than holding force exerted by the interference fitting. This makes it possible to subsequently adjust a preload which has already been applied to the bearing, whereby the preload can be adjusted to an optimal value in accordance with the apparatus in which the bearing is assembled.

BRIEF DESCRIPTION OF THE DRAWINGS

The above and other objects, features and advantages of the present invention will become apparent from the following description and the appended claims, taken in conjunction with the accompanying drawings, in which:

Figure 2A:
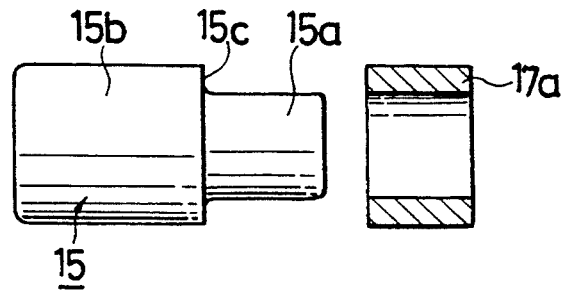
FIGS. 2(A) through 2(E) are cross-sectional views illustrating a second embodiment of the present invention in the order of manufacturing steps.
Figure 2B:
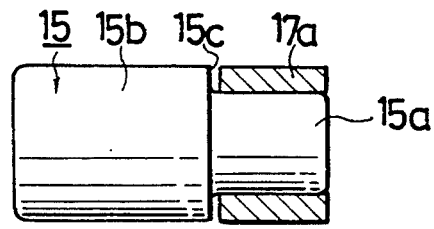
Figure 2C:
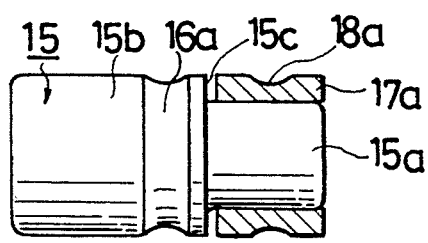
Figure 2D:
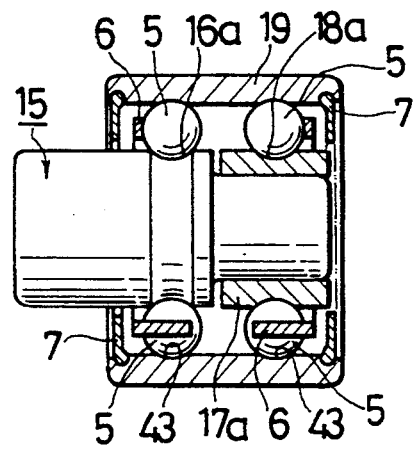
Figure 2E:
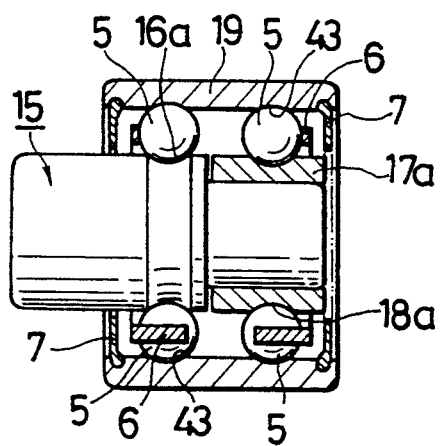
Figure 5A:
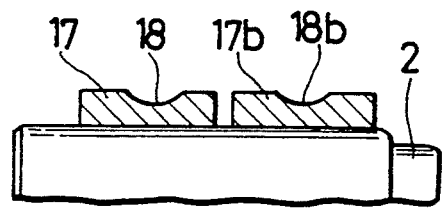
Figure 5B:
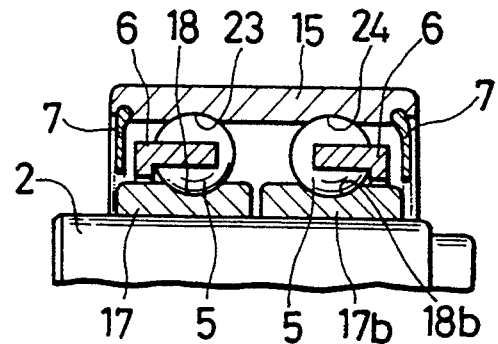
Figure 6:
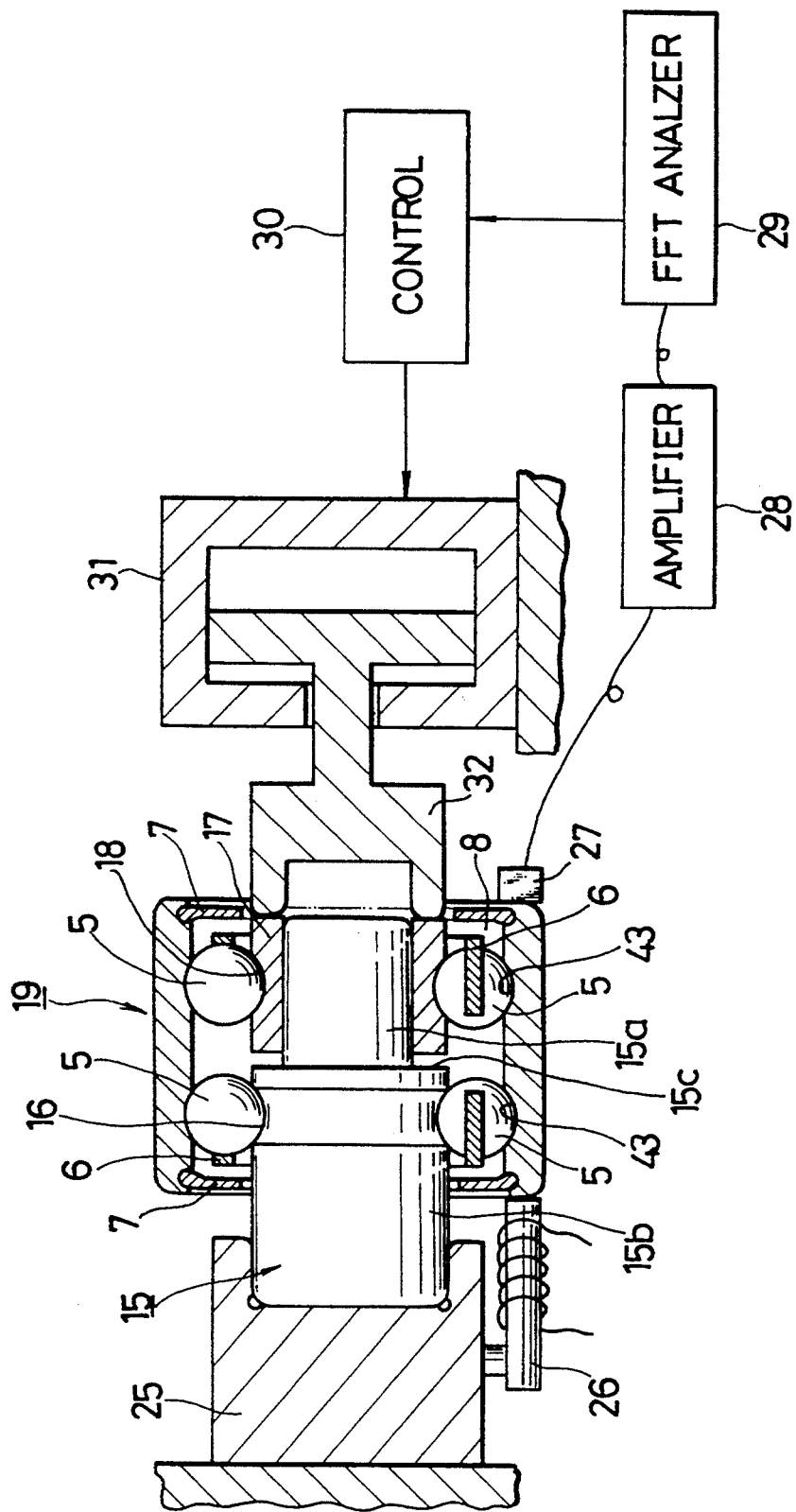
Figure 7:
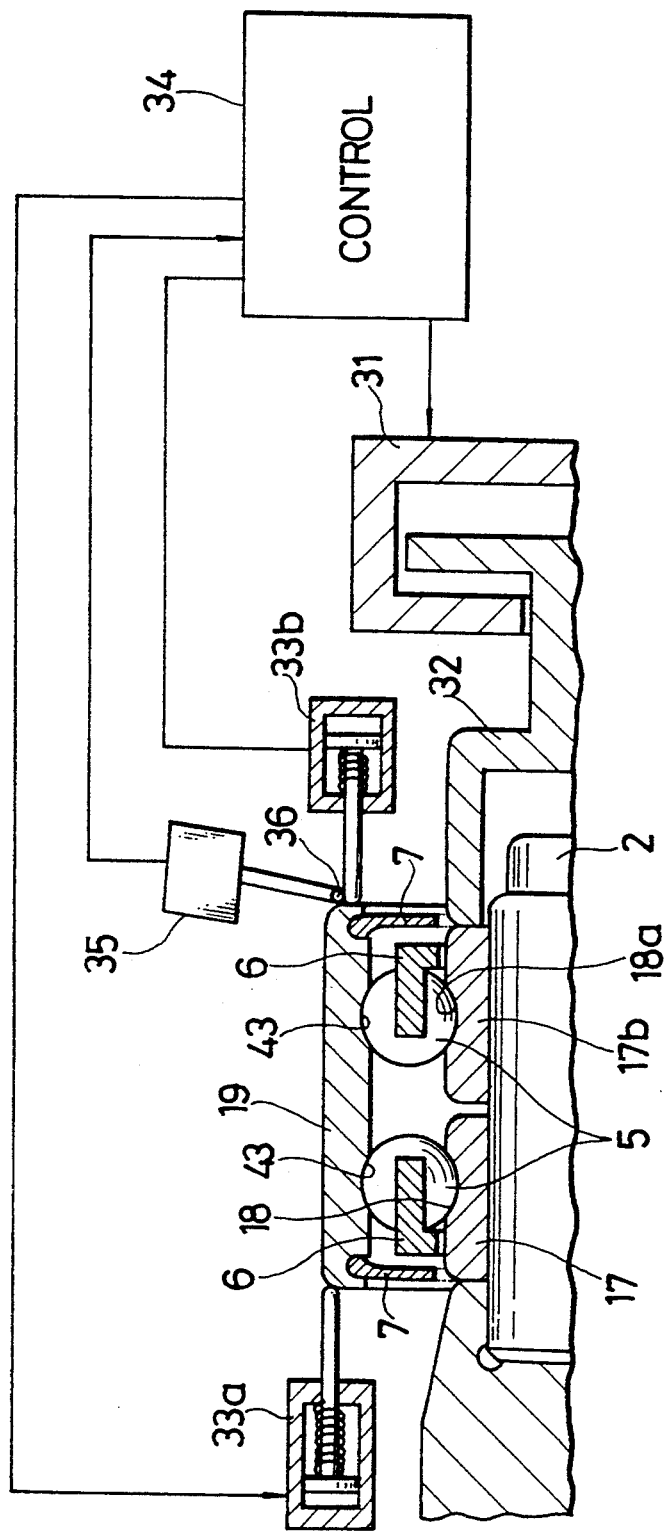
Figure 8:
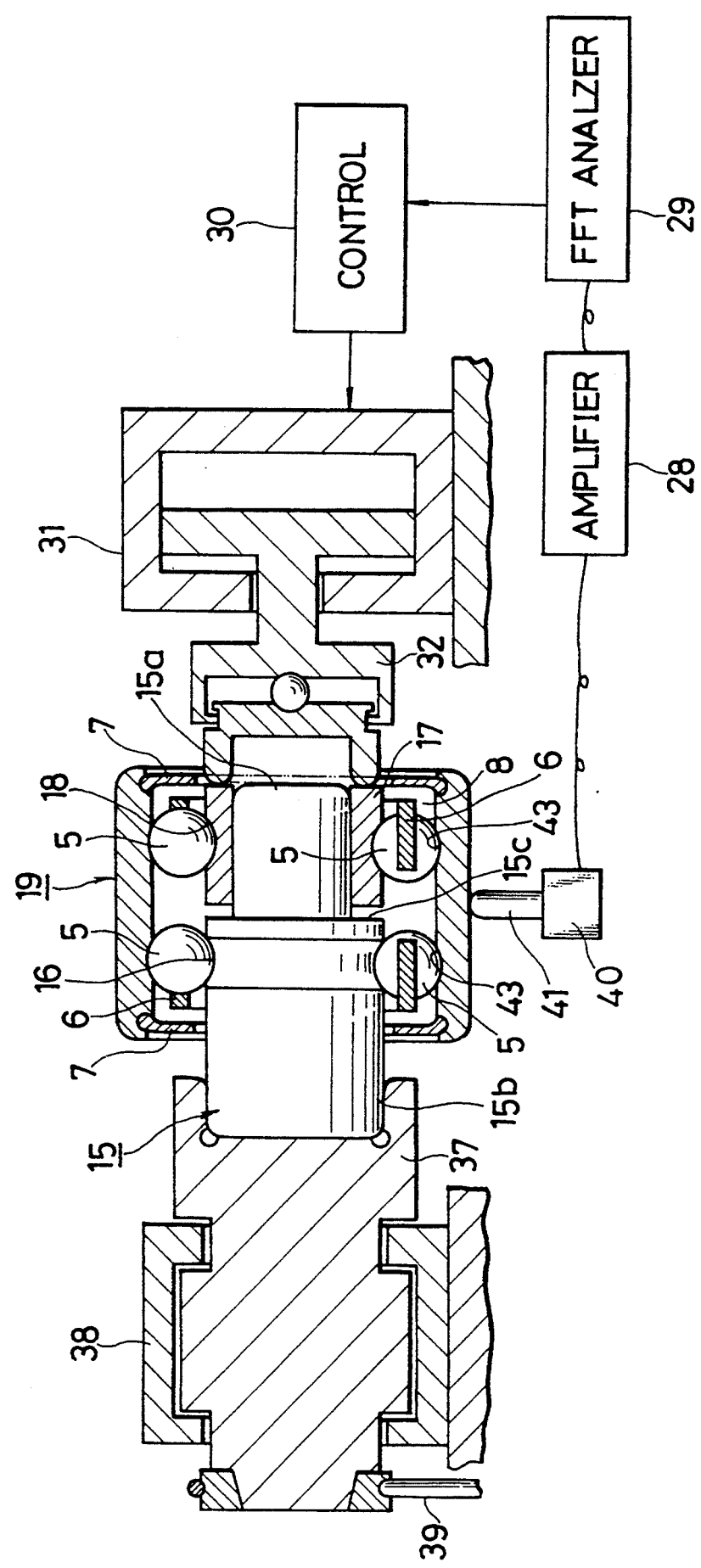
Figure 9:
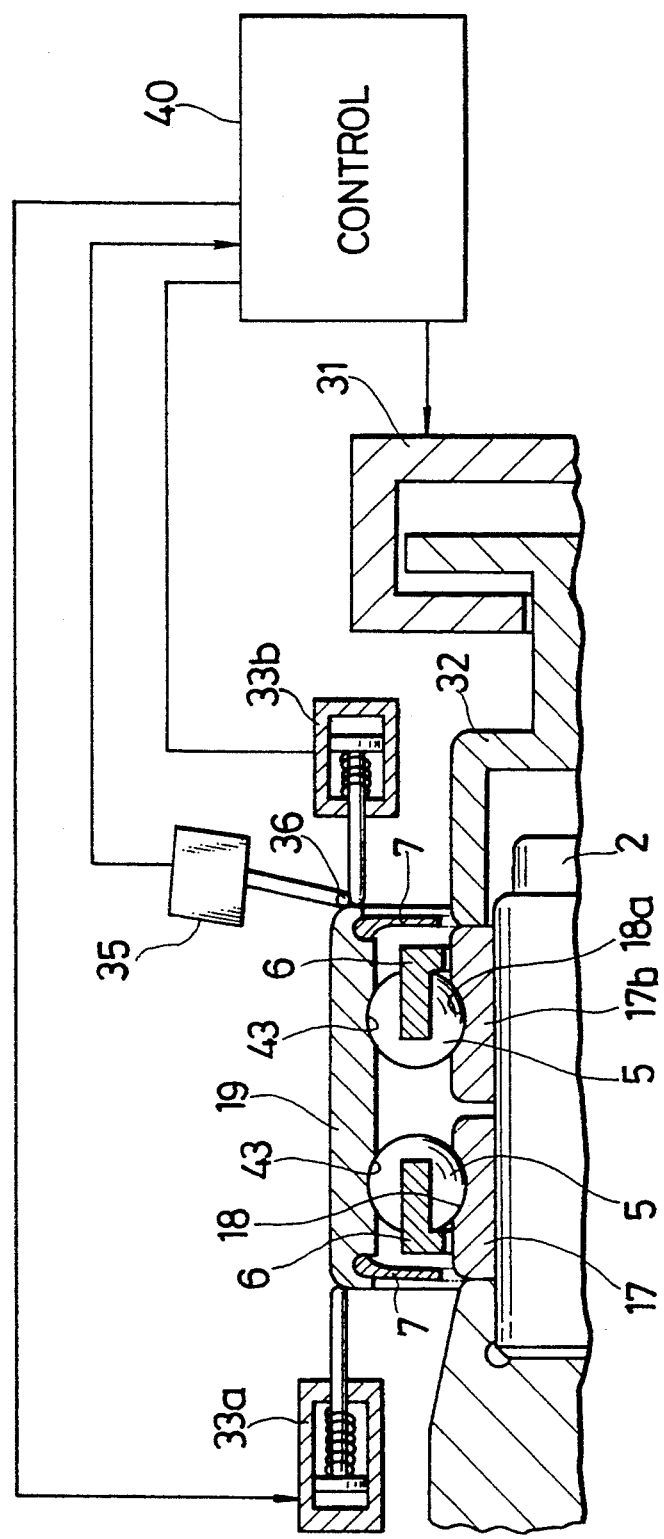
Figure 10:
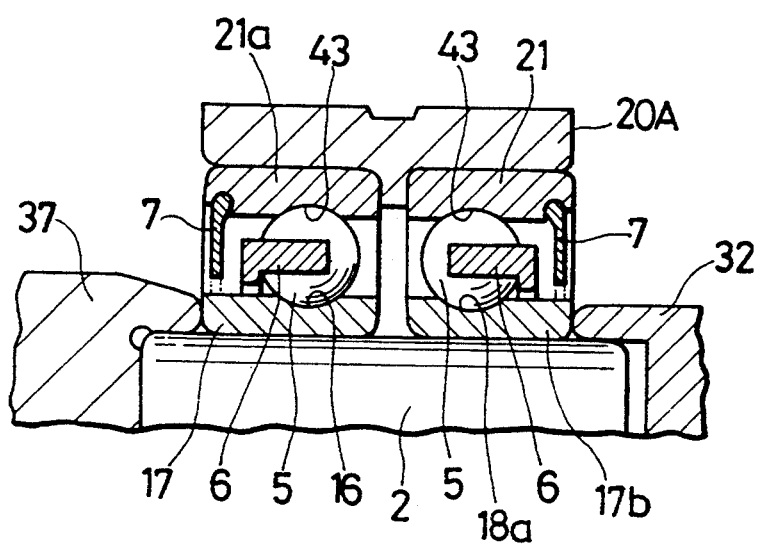
Figure 11:
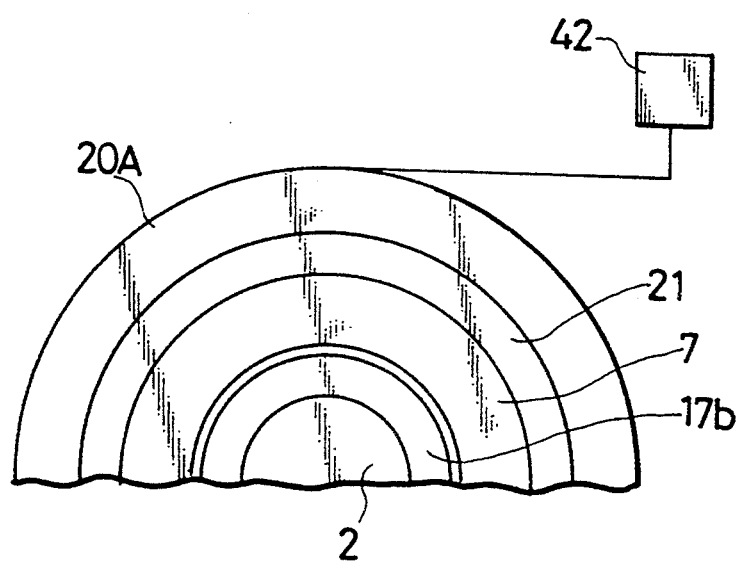
Figure 12A:
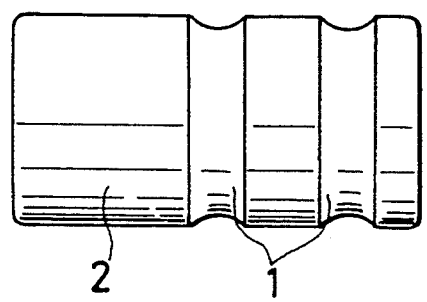
Figure 12B:
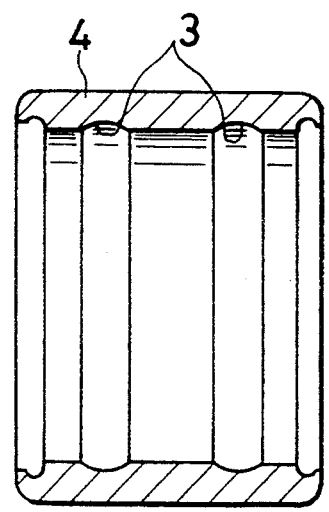
Figure 12C:
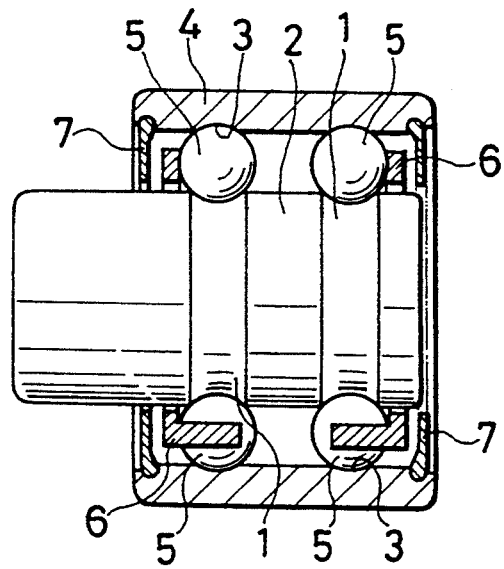
Figure 13:
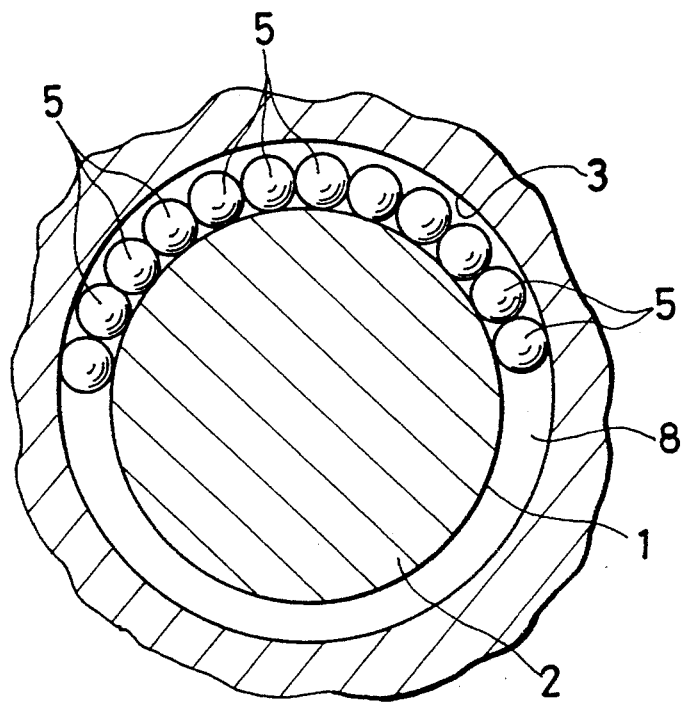
Figure 14:
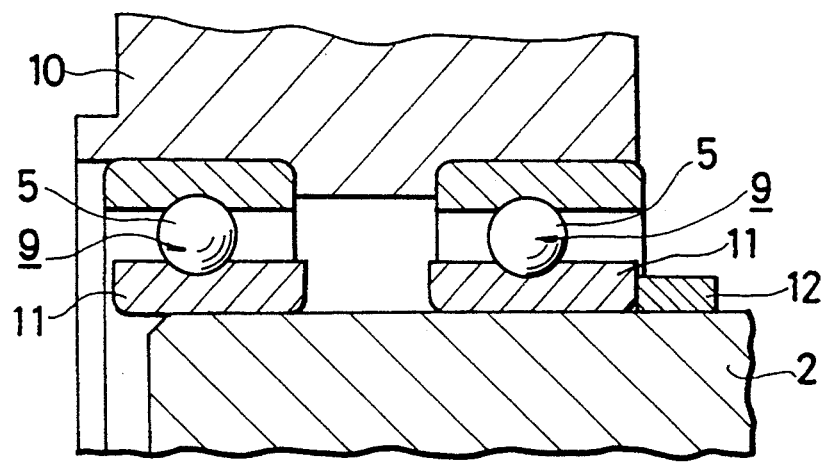
Figure 15:
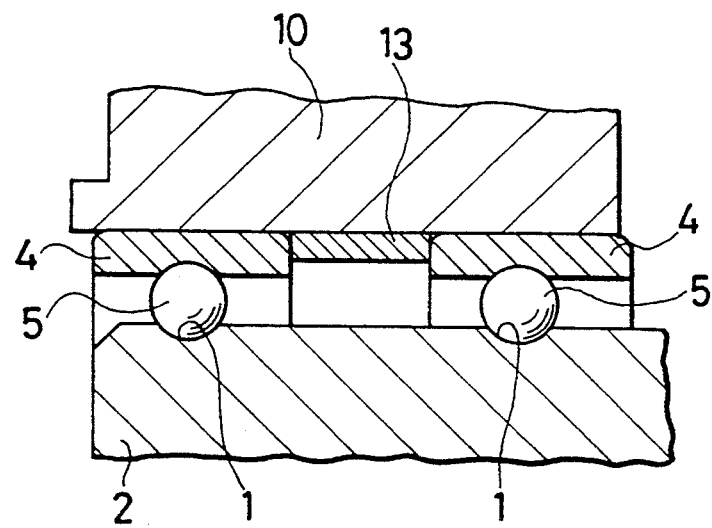
Figure 16:
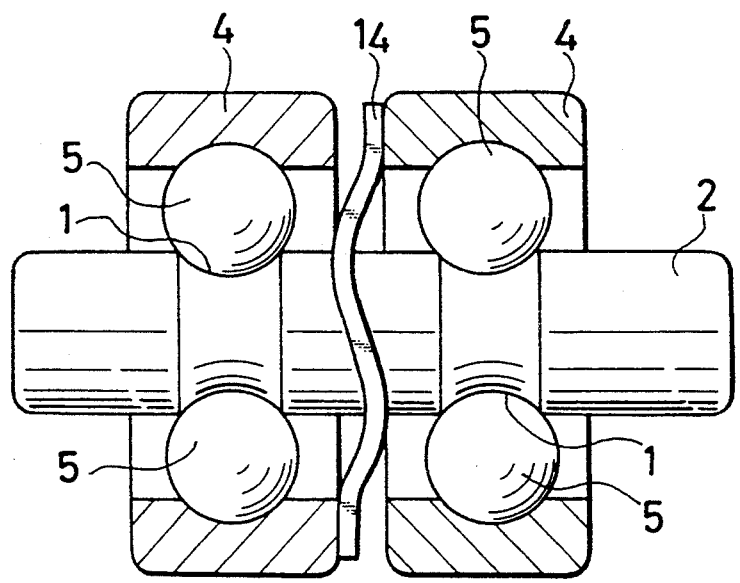
Figure 17:
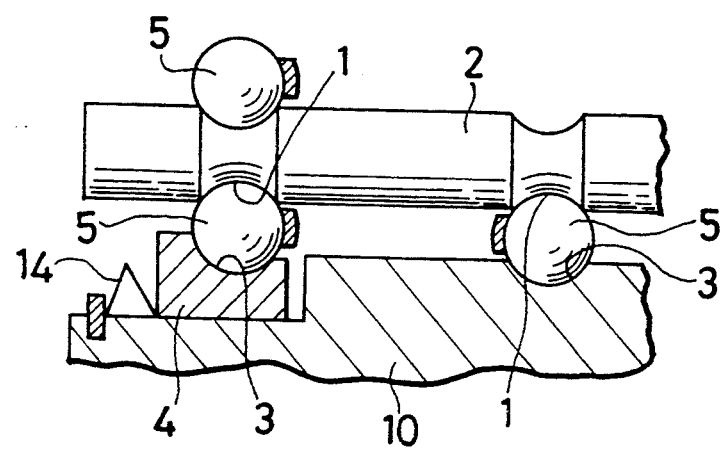
Figure 18:
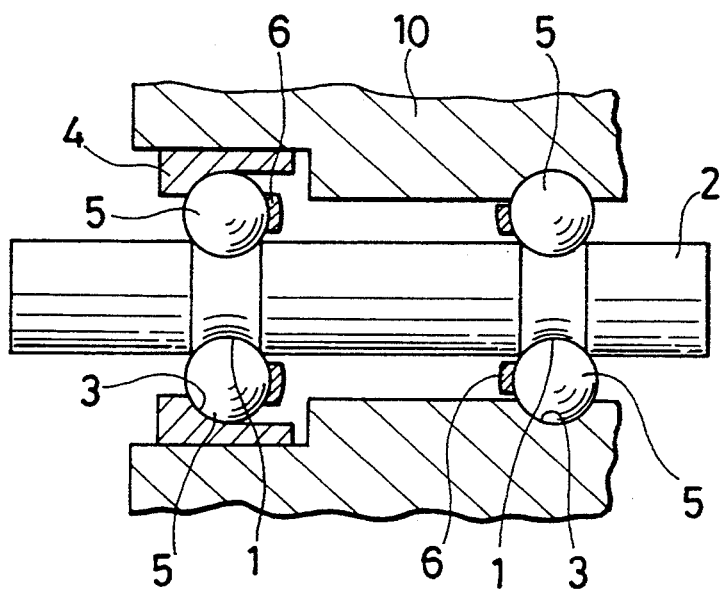
Figure 19:
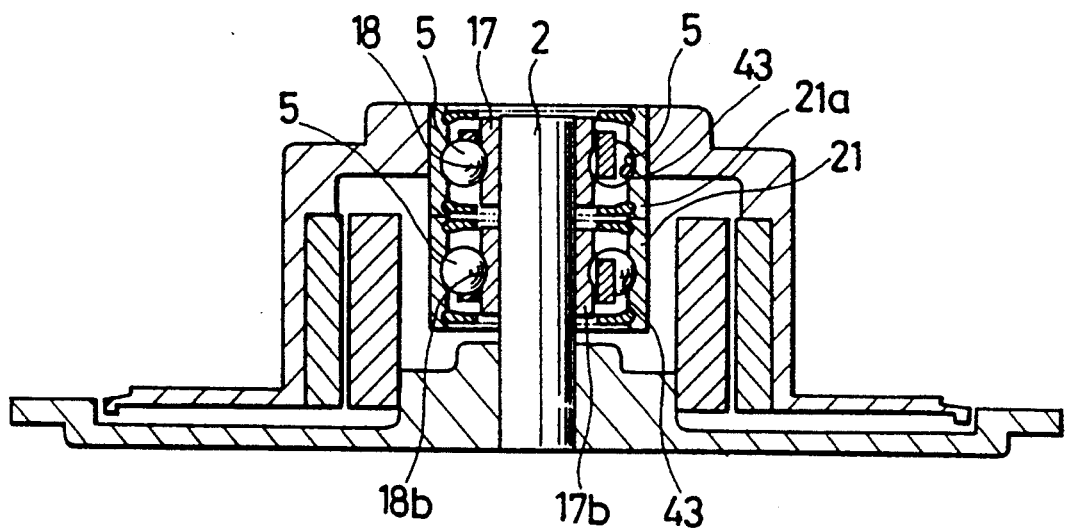
Figure 20:
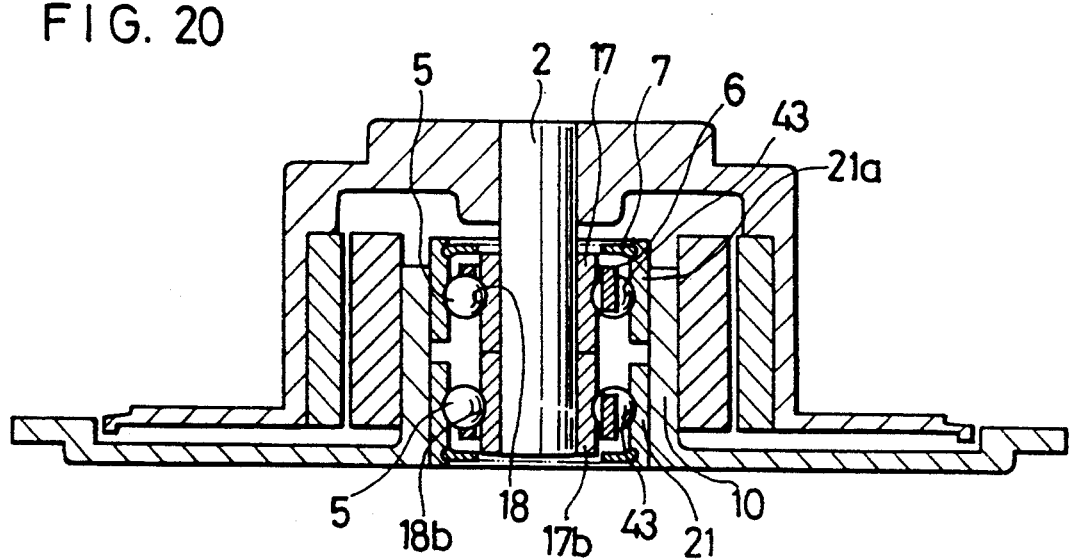
Figure 21:
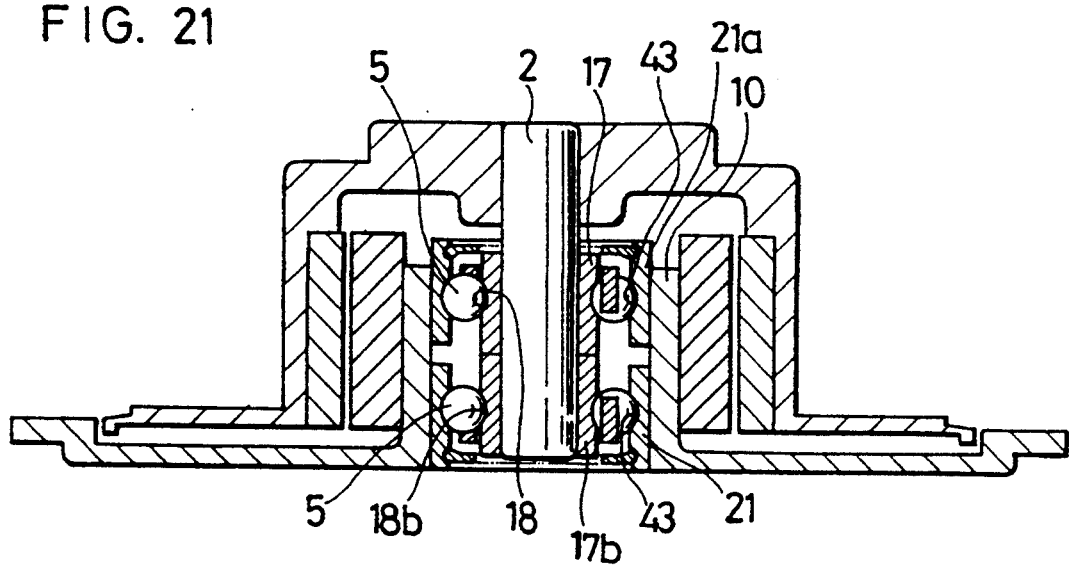
Figure 22:
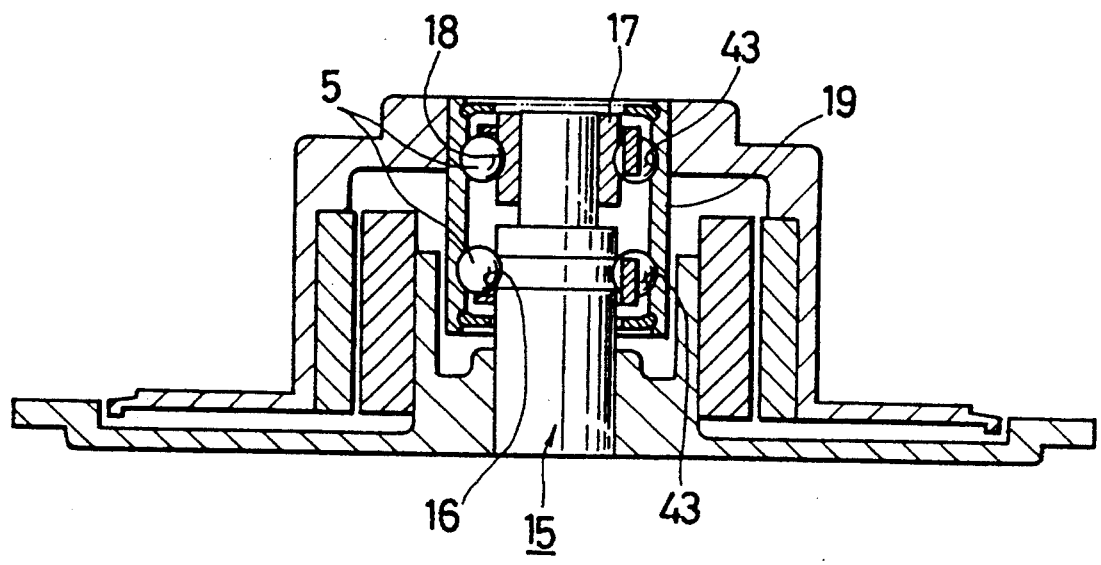
Figure 23:
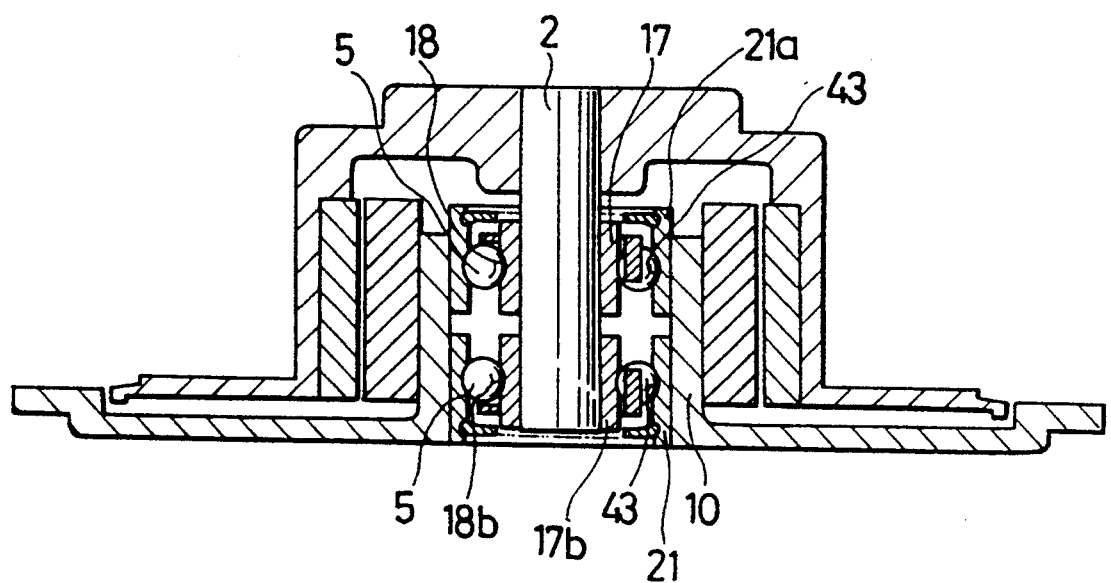

FIGS. (4A) and 4(B) are fragmentary (half) cross-sectional views showing a fourth embodiment of the present invention in the order of manufacturing steps;

FIGS. 5(A) and 5(B) are fragmentary (half) cross-sectional views showing a fifth embodiment of the present invention in the order of manufacturing steps;

FIG. 6 is a cross-sectional view illustrating a first example of methods for adjusting a preload;

FIG. 7 is a cross-sectional view illustrating a second example of the methods for adjusting a preload;

FIG. 8 is a cross-sectional view illustrating a third example of the methods for adjusting a preload;

FIG. 9 is a cross-sectional view illustrating a fourth example o the methods for adjusting a preload;

FIG. 10 is a cross-sectional view illustrating a fifth example of the methods for adjusting a preload;

FIG. 11 is a side view of the bearing of FIG. 10, as viewed from a side in FIG. 10;

FIGS. 12(A) through FIG. 12(C) are front or cross-sectional views showing parts of a rolling bearing known conventionally and the rolling bearing as completed;

FIG. 13 is a fragmentary cross-sectional view of a ball bearing in which an outer ring groove and its corresponding inner race groove are made eccentric to permit insertion of balls;

FIG. 14 is a fragmentary (half) cross-sectional view of a first example of conventional structures;

FIG. 15 is a fragmentary (half) cross-sectional view of a second example of the conventional structures;

FIG. 16 is a fragmentary (half) cross-sectional view of a third example of the conventional structures;

FIG. 17 is a fragmentary (half) cross-sectional view of a fourth example of the conventional structures;

FIG. 18 is a fragmentary (half) cross-sectional view of a fifth example of the conventional structures;

FIG. 19 is a cross-sectional view showing a method for adjusting a preload of a bearing upon its assembly in a motor for HDD;

FIG. 20 is a cross-sectional view showing a modification of the method of FIG. 19;

FIG. 21 is a cross-sectional view illustrating another modification of the method of FIG. 19;

FIG. 22 is a cross-sectional view of the ball bearing of FIG. 2(E) as assembled in a motor; and FIG. 23 is a cross-sectional view illustrating a still further method for adjusting a preload.

DETAILED DESCRIPTION OF THE INVENTION AND PREFERRED EMBODIMENTS

The first embodiment of the present invention will now be described with reference to FIGS. 1(A) through 1(D). In a spindle 15, a small-diameter portion 15a and a large-diameter portion 15b are connected at a stepped portion 15c as shown in FIG. 15(A). In an outer peripheral wall of the large-diameter portion 15b, said outer peripheral wall serving as a first peripheral wall, a deep inner race groove 16 is formed as a main race groove. An inner race 17 has an inner diameter which is slightly smaller than an outer diameter of the small-diameter portion 15a in a free state. This inner race 17 defines a subordinate inner race groove 18 of the deep groove type in an outer peripheral wall thereof.

Figure 1A:
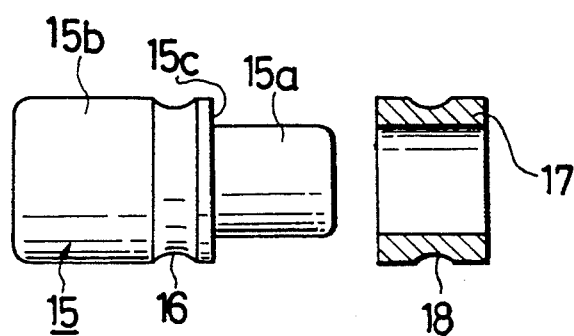
FIGS. 1(A) through 1(D) are cross-sectional views showing a first embodiment of the present invention in the order of manufacturing steps.
Figure 1B:
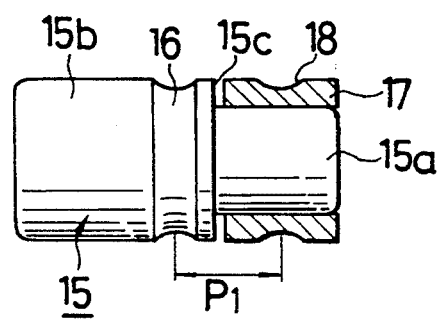

Upon manufacture of a rolling bearing having the spindle 15 and the inner race 17, the inner race 17 is, as a first step, externally fitted on the small-diameter portion 15a of the spindle 15 with sufficient strength of fitting (i.e., with strength sufficient to prevent any displacement of the inner race 17 relative to the small-diameter portion 15a even under a reaction force produced upon application of a preload) as illustrated in FIG. 1(B). A pitch $P_1$ between the main inner race group 16 in the outer peripheral wall of the large-diameter portion 15b and the subordinate inner race groove 18 in the outer peripheral wall of the inner race 17 is set longer than a pitch $P_1$ required to apply a predetermined preload to the rolling bearing after its completion (i.e., $P_1 > P_1$).

As a second step, the spindle 15 and the inner race 17 assembled together in the first step is next inserted inside a cylindrical outer race 19. A pair of deep outer race grooves 43,43 have been formed in an inner peripheral wall of the outer race 19. The paired outer race grooves 43,43 are positioned opposite the main and subordinate, inner race grooves 16,18, respectively.

As a third step, the spindle 15 and the inner and outer races 17,19 are next made eccentric with each other so that, as illustrated in FIG. 13 described above, radial spacings 8 extending in a circumferential direction between the paired outer race grooves 43,43 and the main and subordinate, inner race grooves 16,18 are widened at certain parts. Through the parts of the spacings so widened, balls 5,5 are inserted into the respective spacings as many as desired.

Figure 1C:
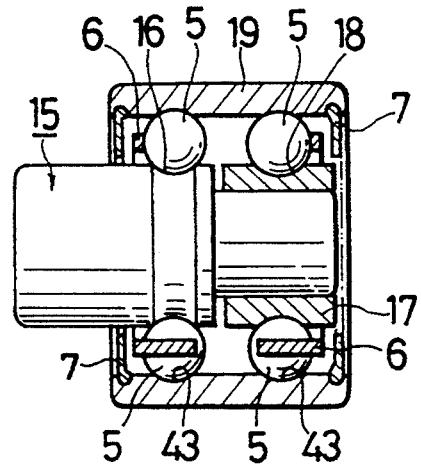

As a fourth step, the spindle 15 and the inner and outer races 17,19 are then brought into a concentric relationship while moving, in a circumferential direction, the desired numbers of balls 5,5 inserted in the respective spacings between the paired outer race grooves 43,43 and the main and subordinate, inner race grooves 16,18, whereby the individual balls are arranged at equal angular intervals. In addition, the retainers 6,6 are disposed on the respective rows of balls as illustrated in FIG. 1(C) so that the individual balls 5,5 are held at equal angular intervals. The seals 7,7 can also be arranged, as needed, on the inner peripheral wall of the outer race 19 at opposite end portions thereof. At this point, no preload has yet been applied to the individual balls 5,5.

Figure 1D:
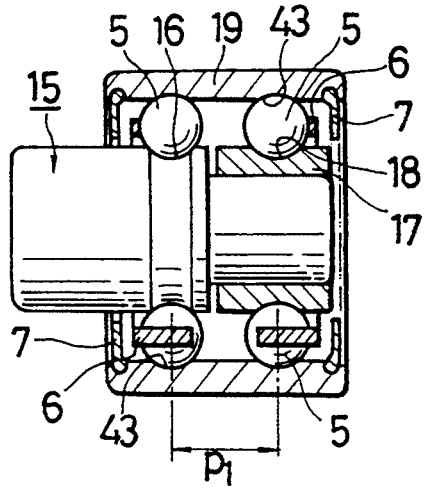

As a fifth step, the inner race 17 is finally displaced axially [i.e., leftwards as viewed in FIG. 1(D)] on the outer peripheral wall of the spindle 15 toward the stepped portion 15c, whereby the pitch between the main inner race groove 16 and the subordinate inner race groove 18 is shortened to the pitch $P_1$ which is required to apply the predetermined preload. At this point, the plural balls 5,5 has been applied with the predetermined preload so that the bearing is completed as a preloaded rolling bearing. Even at the time of completion of the assembly, there is a spacing between the stepped portion 15c and a proximal end face of the inner race 17.

In the preloaded rolling bearing obtained as described above, a holding force greater than an axial load corresponding to the preload occurs based on a frictional force of the interference fitting between the inner peripheral wall of the inner race 17 and the outer peripheral wall of the small-diameter portion 15a. Without the need for coating an adhesive between the spindle 15 and the inner race 17, the inner race 17 is not dislocated and the preload so applied is not lost. The assembly so completed can therefore be handled as an integral ball bearing. This can hence facilitate the work which is required to construct a bearing portion for a spindle in VTR or HDD. Owing to the preload applied in the axial direction, the rotatable support of the spindle can be achieved with high accuracy.

The inner race 17 can however be displaced relative to the small-diameter portion 15a by axially applying a force greater than the holding force produced by the interference fitting. It is therefore possible to subsequently adjust, namely, either increase or decrease the preload applied to the rolling bearing provided that a suitable force greater than the load mentioned above is applied to the inner race 17 to have the inner race 17 displaced in an axial direction.

Next, FIGS. 2(A) through 2(E) illustrate the second embodiment. As opposed to the above-described first embodiment in which, in the first step, the inner race 17 with the subordinate inner race groove 18 formed beforehand in the outer peripheral wall thereof was externally fitted on the spindle 15 having the inner race groove 16 formed beforehand in the outer peripheral wall thereof, main and subordinate, outer race grooves 16a,18a are respectively formed in the outer peripheral walls of the spindle 15 and the inner race 17a subsequent to external fitting of an inner race 17a on the small-diameter portion 15a as depicted in FIGS. 2(A) through 2(C) in this embodiment.

By adopting such a construction, the external fitting of the inner race 17a on the small-diameter portion 15a can prevent the inner race groove 18 [see FIGS. 1(A) through 1(D)] from being deformed or distorted into a non-circular shape. In other words, this embodiment features the formation of the subordinate inner race groove 18a after the spindle 15 and the inner race 17a have been assembled together. This makes it possible to improve the roundness of the inner race groove 18a to a level of very high accuracy and, moreover, to minimize the eccentricity between the inner race groove 18a and the spindle 15.

The remaining construction and operation are as in the first embodiment described above, so that like elements of structure are identified by like reference numerals and their description is omitted herein to avoid unnecessary repetition.

Figure 3A:
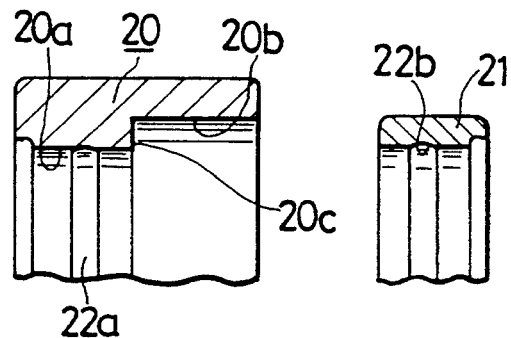
FIGS. 3(A) through 3(E) are fragmentary (half) cross-sectional views showing a third embodiment of the present invention in the order of manufacturing steps.

Reference is next made to FIGS. 3(A) through 3(E) which illustrates the third embodiment of the present invention. As is depicted in FIG. 3(A), formed in an inner peripheral wall of a main outer race 20 are a small diameter portion 20a, a large diameter portion 20b, and a stepped portion 20c connecting the portions 20a and 20b together. A subordinate outer race 21 is internally fittable in the large-diameter portion 20b. In an inner peripheral wall of the subordinate outer race 21 and an inner peripheral wall of the small-diameter portion 20a, grooves 22a,22b having an arcuate cross-section are formed over the entire circumferences thereof, respectively. Further, the subordinate outer race 21 has an outer diameter which is somewhat greater in a free state than the inner diameter of the large-diameter portion 20b.

Figure 3B:
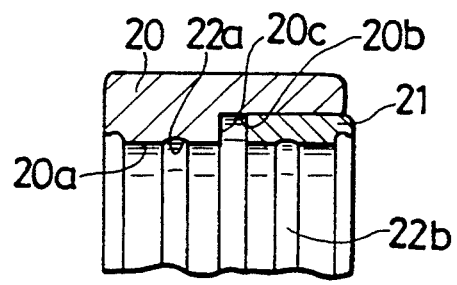
Figure 3C:
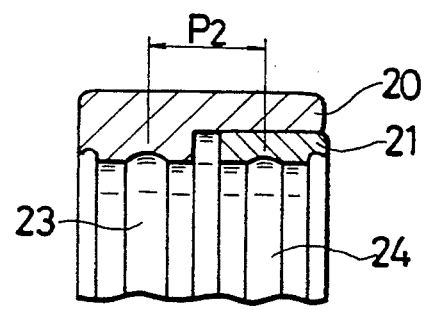

To manufacture a preloaded rolling bearing by using the main outer race 20 and the auxiliary outer race 21, as a first step, the subordinate outer race 21 is first fitted internally in the large-diameter portion 20b with sufficient strength of fitting as illustrated in FIG. 3(B), and a main outer race groove 23 as a main groove and a subordinate outer race groove 24 as a subordinate groove are formed in the grooves 22a,22b, respectively, as shown in FIGS. 3(C).

As has been described above, the main and subordinate, outer race grooves 23,24 are formed after the main outer race 20 and the subordinate outer race 21 have been assembled. The roundness of these outer race grooves 23,24 can therefore be improved to a high level of accuracy and, moreover, the eccentricity between the outer race grooves 23,24 and the outer peripheral wall of the main outer race 20 can be minimized. Incidentally, the pitch $P_2$ between the main outer race groove 23 and the subordinate outer race groove 24 formed as described above should be set longer than a pitch $P_2$ [see FIG. 3(E)] which is required to apply a predetermined preload ($P_2 > P_2$).

As a second step, a spindle with inner race grooves 1,1 formed in a pair in an outer peripheral wall [see FIG. 3(D) to be described subsequently] is next inserted inside the main outer race 20 and the subordinate outer race 21 assembled together in the first step, whereby the paired inner race grooves 1,1 are positioned opposite the main and subordinate, outer race grooves 23,24, respectively.

As a third step, as illustrated in FIG. 13, the spindle 2 and the main outer race 20 and subordinate outer race 21 are then made eccentric relative to each other and balls 5,5 are inserted, as many as needed, in spacings between the paired inner race grooves 1,1 and the main and subordinate, outer race grooves 23,24, respectively.

Figure 3D:
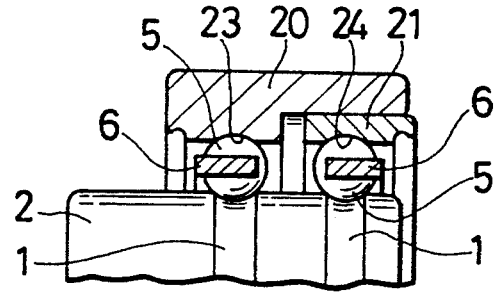

As a fourth step, as shown in FIG. 3(D), the spindle 2 and the outer main race 20 and subordinate outer race 21 are next made concentric relative to each other, and the balls 5,5 inserted as many as needed between the paired inner race grooves 1,1 and the main and subordinate, outer race grooves 23,24 are arranged at equal angular intervals. In this fourth step, retainers 6,6 are attached to the balls 5,5 arranged at equal intervals.

Figure 3E:
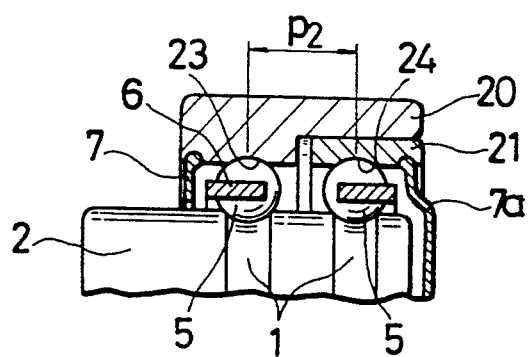

As a fifth step, the subordinate outer race 21 is finally displaced in an axial direction, that is, in a leftward direction as viewed in FIG. 3(D), along the inner peripheral wall of the main outer race 20 so that, as is depicted in FIG. 3(E), the pitch between the main outer race groove 23 and the subordinate outer race groove 24 is shortened to the pitch $P_2$ required to apply a predetermined preload. At this point, the predetermined preload is applied to the plural balls 5,5. Seals 7,7a are then attached so that a rolling bearing is completed.

Figure 4A:
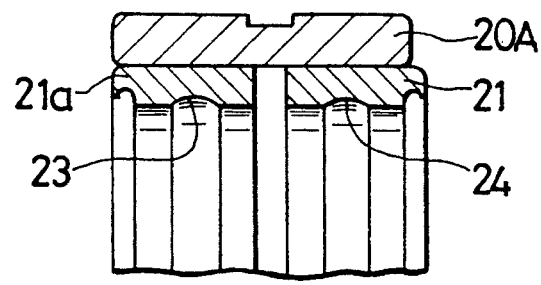
Figure 4B:
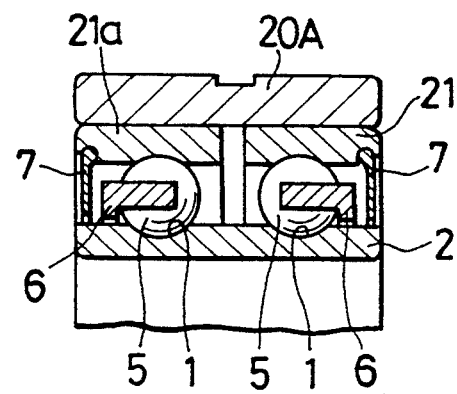

Although the main outer race groove 23 was formed directly in the inner peripheral wall of the main outer race 20 in the third embodiment described above, a pair of subordinate outer races 21,21a can be internally fitted in a main outer race 20A, which itself does not have any outer race groove, as in the fourth embodiment shown in FIGS. 4(A) and 4(B). Likewise, the first and second embodiments can also be constructed with a pair of inner races 17,17b externally fitted on the spindle 2 as illustrated in FIGS. 5(A) and 5(B) which show the fifth embodiment. Where subordinate races and inner races are each provided in a pair as described above, one or both of the subordinate outer races or inner races are displaced upon application of a preload.

A description will next be made of a method for adjusting the displacement of the small-diameter portion 15a of the spindle 15 (or the large-diameter portion 20b of the main outer race 20) in order to perform application of an appropriate preload. FIG. 6 illustrates one example of the method. Upon assembling a preloaded rolling bearing manufactured by such a method as illustrated in FIG. 1, an end portion (a left-hand end portion as viewed in FIG. 6) of the spindle 15 is held by a holder 25 and a vibrator 26 is brought into abutment against an end face (a left-hand end face as viewed in FIG. 6) of the outer race 19 to apply vibrations to the rolling bearing through the outer race 19. Further, a vibration sensor 27 is brought into abutment against an opposite end face (the right-hand end face as viewed in FIG. 6) of the outer race 19 so that a resonance frequency of the rolling bearing can be measured.

The resonance frequency of the rolling bearing, said resonance frequency having been detected by the vibration sensor 27, is inputted to a control 30 via an amplifier 28 and an FFT analyzer 29 which performs a fast Fourier transform (FFT). This control 30 governs a pusher 31 which is adapted to push the inner race 17 over the small-diameter portion 15a of the spindle 15. In the illustrated example, a hydraulic cylinder is used as the pusher 31. The control 30 governs the amount or pressure of a working fluid to be fed into the pusher 31, so that the force under which a pushing arm 32 of the pusher 31 pushes the inner race 17 can be adjusted.

Where an appropriate preload is applied to the individual balls 5,5 by pushing the inner race 17 over the small-diameter portion 15a upon manufacture of the rolling bearing, the working fluid is fed to the pusher 31 to push the inner race 17 by the pushing arm 32 while measuring the resonance frequency of the rolling bearing by the vibration sensor 27. As a result, the inner race 17 is press fitted on the small-diameter portion 15a of the spindle 17. When the resonance frequency has been brought substantially into conformity with a preset frequency, the feeding of the working fluid into the pusher 31 is stopped to complete the press fitting work so that the press fitting operation is finished. At this point, a rolling bearing applied with an appropriate preload has been completed.

Existence of a certain constant relationship between a resonance frequency and a preload of a rolling bearing is known for many years as disclosed, for example, in Japanese Patent Publication (Kokoku) No. HEI 2-61700. If a resonance frequency of a rolling bearing having the same construction as a rolling bearing to be manufactured and applied with an appropriate preload is measured in advance and the value so measured is set at the control 30, feeding of the working fluid to the pusher 31 is stopped when the preload of the rolling bearing has reached the appropriate preload. It is necessary to perform only once the work which is required to apply the appropriate preload to the rolling bearing for setting the resonance frequency. The efficiency of the manufacturing work is hence not impaired even if the work for applying the appropriate preload becomes cumbersome.

As the pusher 31 for pushing the inner race 17, an air cylinder or a feed screw can also be used besides such a hydraulic cylinder as illustrated in the drawing.

Next, FIG. 7 illustrates a second example of the method for adjusting such a displacement. A manufacturing apparatus for applying an appropriate preload to a preloaded rolling bearing manufactured by such a method as shown in FIG. 5 is provided with a pair of pushers 33a,33b on opposite sides of the outer race 19, respectively. In the illustrated example, air cylinders are employed as the pushers 33a,33b. The amount or pressure of compressed air to be fed to the respective pushers 33a,33b is governed by the control 34. A probe 36 of a displacement sensor 35 is maintained in contact with an end face (a right-hand end face as viewed in FIG. 7) of the outer race 19 to permit the measurement of a displacement of the outer race 19 in an axial direction (i.e., in a horizontal direction as viewed in FIG. 7). A measurement value of the displacement sensor 35 is inputted to the control 34.

The control 34 governs the feeding of compressed air to the respective pushers 33a,33b and also the feeding of the working fluid to the pusher 31 adapted to push the inner race 17b. Where the inner race 17b is pushed onto the spindle 2 to apply an appropriate preload to the individual balls 5,5 upon manufacture of the rolling bearing, the paired pushers 33a,33b are operated alternately and while measuring by the displacement sensor 35 displacements of the outer race 19 caused by the alternate operation of the pushers 33a,33b, the working fluid is fed to the pusher 31 to push the inner race 17b by the pushing arm 31. As a consequence, the inner race 17b is press fitted on the spindle 2. When the displacement has become substantially equal to the preset value, the feeding of the working fluid to the pusher 31 is stopped to complete the pushing work.

It is also known for many years that there is a certain constant relationship between a displacement and a preload of a rolling bearing when a predetermined load is applied to the rolling bearing. If a displacement of a rolling bearing, which has the same construction as a rolling bearing to be manufactured and has been applied with an appropriate preload, upon application of a load to the former rolling bearing is measured beforehand and the value so measured is set at the control 34 in advance, the feeding of the working fluid to the pusher 31 is stopped when the preload of the rolling bearing has reached the appropriate value.

Next, FIG. 8 illustrates a third example of the method for adjusting the displacement of the inner race 17 (or the subordinate outer race 21) relative to the small-diameter portion 15a of the spindle 15 (or the large-diameter portion 20b of the main outer race 20) in order to apply an appropriate preload to the rolling bearing. A holder 37 with an end portion (a left-hand end portion as viewed in FIG. 8) of the spindle 15 held thereby is rotatably supported by a gas bearing 38. The holder 37 and the spindle 15 are rotated by an unillustrated electric motor via a drive belt 39. A suitable stopper is applied to the outer race 19 arranged around the spindle 15 so that the outer race 19 is prevented from rotating upon rotation of the spindle 15. This stopper should be constructed in such a way that it does not prevent vibrations of the rolling bearing. A probe 41 of a vibration sensor 40 is maintained in contact with the outer peripheral wall of the outer race 19.

Where the inner race 17 is pushed onto the small-diameter portion 15a of the spindle 15 to apply an appropriate preload to the individual balls 5,5 upon manufacturing the rolling bearing, the working fluid is fed to the pusher 31 while performing an analysis of vibrational characteristics of the rolling bearing by the vibration sensor 40, namely, while conducting a frequency analysis of sounds or vibrations of the rolling bearing. By pushing the inner race 17 with the pushing arm 32, the inner race 17 is press fitted on the small-diameter portion 15a of the spindle 15. When the vibrational characteristics have been brought substantially into conformity with preset characteristics, the feeding of the working fluid to the pusher 31 is stopped to complete the press fitting work.

It is also known for many years that there is a constant relationship between vibrational characteristics and a preload of a rolling bearing. If vibrational characteristics of a rolling bearing, which has the same construction as a rolling bearing to be manufactured and has been applied with an appropriate preload, are analyzed beforehand and the data of the analysis are set at the control 30 in advance, the feeding of the working fluid to the pusher 31 is stopped when the preload of the rolling bearing has reached the appropriate value.

Next, FIG. 9 illustrates a fourth example of the method for adjusting the displacement of the inner race 17 (or the subordinate outer race 21) relative to the small-diameter portion 15a of the spindle 15 (or the large-diameter portion 20b of the main outer race 20) in order to apply an appropriate preload to the rolling bearing. To manufacture a preloaded rolling bearing, the paired pushers 33a,33b are operated alternately while the plural balls 5,5 are maintained free from any preload. As a result, a load of a predetermined magnitude is axially (i.e., in a horizontal direction as viewed in FIG. 9) applied to the outer race 19 so that the outer race is axially displaced. The resulting displacement of the outer race 19 is then measured by the displacement sensor 35. The measurement value of the displacement sensor 35 is inputted to the control 40. Based on the measurement value, the control 40 then determines an axial play or clearance of the rolling bearing. The determination of the play or clearance from the displacement upon application of the predetermined load to the outer race 19 can be easily conducted in a manner known per se in the art.

Further, the control 40 actuates the pusher 31 to axially push the inner race 17b over a distance corresponding to the play or clearance so determined. After the inner race 17b has been pushed in the axial direction, the balls 5,5 are in a preloaded state. In the present example, the distance over which the inner race 17b is pushed must be precisely controlled.

FIGS. 10 and 11, next, illustrates a fourth example of the method for adjusting the displacement of the inner race 17 (or the subordinate outer race 21) relative to the small-diameter portion 15a of the spindle 15 (or the large-diameter portion 20b of the main outer race 20) in order to apply an appropriate preload to the rolling bearing. To manufacture a preloaded rolling bearing, the spindle 2 is rotated via the holder 37, and while measuring by a load sensor 42 the rotational torque (torque loss) of the main outer race 20A which tends to rotate together with the spindle 2, the inner race 17b is pushed by the pushing arm 32 to press fit the inner race 17b on the spindle. When the torque loss has become substantially equal to a preset value, the pushing arm 32 is stopped to complete the press fitting work.

It has been known for many years that there is a constant relationship between a torque loss and a preload of a rolling bearing. If a torque loss of a rolling bearing, which has the same construction as a rolling bearing to be manufactured and has been applied with an appropriate preload, is analyzed beforehand and the measurement value is set at a control in advance, the pushing arm 32 is stopped when the preload of the rolling bearing has reached the appropriate value.

It is to be noted that the above-described preloading methods of FIGS. 6 to 9 can also be used upon manufacture of a double-row, tapered roller bearing or when two single-row rolling bearings are combined to construct a rolling bearing in which the rolling bearings are each applied with a predetermined preload.

Each preloading method according to the present invention can also be used to adjust the preload of a rolling bearing upon assembling the rolling bearing in a motor of HDD as shown in FIGS. 19 to 23.

In FIG. 19, two outer races 21,21a are in direct contact to each other in a preloading direction, and a spindle 2 and inner races 17,17b are fitted together with sufficient strength of fitting. A motor is rotated, and while measuring vibrations, the inner race 17 is pushed toward the inner race 17b. The pushing of the inner race 17 is stopped when the characteristics of the vibrations have become equal to preset vibrational characteristics.

FIG. 20 illustrates a modification in which the outer races 21,21a are maintained in contact with each other via a flange of a housing 10.

Another modification is illustrated in FIG. 21, the inner races 17,17b are maintained in direct contact to each other in a preloading direction, and the outer races 21,21a are fitted in the housing 10 with sufficient strength of fitting. Like the preloading method of FIG. 19, preloading is conducted by pushing the outer race 21 toward the outer race 21a while rotating the motor.

In FIG. 22, the rolling bearing of FIG. 2(E) has been assembled in a motor. Like the preloading method of FIG. 19, the preload of the rolling bearing can be adjusted by pushing the inner race 17 while rotating the motor.

A still further modification is shown in FIG. 23, in which the outer races 21,21a and the housing 10 are fitted together with sufficient strength of fitting and the inner races 17,17a and the spindle 2 are also fitted together with sufficient strength of fitting. The extent of pushing of each of the inner race 17b and the outer race 21 can be adjusted as in the method of FIG. 19.

Incidentally, the outer races 21 and 21a are arranged in direct contact to each other in FIG. 19. A spacer may be interposed therebetween. As a further alternative, they may be formed as an integral unit.

Further, the inner races 17 and 17b are disposed in direct contact to each other in FIG. 21. A spacer may be interposed therebetween. They may be formed as an integral unit. As a still further alternative, they may be arranged integrally with the spindle as in FIG. 3(E).

We claim:

1. A method for setting the preload of a preload-adjustable bearing constructed of a first rotary unit and second rotary unit rotatable relative to each other, said first rotary unit having a first race and second race arranged immobile in a direction approaching toward each other, said second rotary unit having a third race and fourth race, said third race being located opposite said first race of said first rotary unit with a first row of balls interposed therebetween, said fourth race being located opposite said second race of said first rotary unit with a second row of balls interposed therebetween, said third race being immobile relative to said second rotary unit in a direction away from said fourth race, said fourth race being fitted with said second rotary unit with an interference formed therebetween movably relative to said second rotary unit, and said fourth race being movable toward said third race under pressure along a central axis of the bearing applied between said fourth race and said second rotary unit, which method comprises:

applying pressure along a central axis of the bearing between said fourth race and said second rotary unit; and moving said fourth race toward said third race while measuring by preload measuring means a preload between said first, second, third and fourth races and said first and second rows of balls;

whereby said preload is set at a predetermined value.

2. A method of claim 1, wherein said preload measuring means determines said preload from rotational vibrations of said bearing.

3. A method of claim 1, wherein said preload measuring means determines said preload from rotational sound of said bearing.

4. A method of claim 1, wherein said preload measuring means determines said preload from a reaction to vibrations applied to said bearing.

5. A method of claim 1, wherein said preload measuring means determines said preload from a rotational torque of said bearing.

6. A method of claim 1, wherein said preload measuring means determines said preload from a load-displacement relationship between said first and second rotary units of said bearing.

7. A method for setting the preload of a preload-adjustable bearing constructed of a first rotary unit and second rotary unit rotatable relative to each other, said first rotary unit having a first race and second race arranged immobile in a direction approaching toward each other, said second rotary unit having a third race and fourth race, said third race being located opposite said first race of said first rotary unit with a first row of balls interposed therebetween, said fourth race being located opposite said second race of said first rotary unit with a second row of balls interposed therebetween, said third race and fourth race being fitted with said second rotary unit with an interference formed therebetween movable relative to said second rotary unit, and said third race and said fourth race being capable of relative approaching movement therebetween under pressure along a central axis of the bearing applied between said third race and said fourth race, which method comprises:

applying pressure along a central axis of the bearing between said third race and said fourth race; and effecting relative approaching movement between the third race and the fourth race while measuring by preload measuring means a preload between said first, second, third and fourth races and said first and second rows of balls;

whereby said preload is set at a predetermined value.

8. A method of claim 7, wherein said preload measuring means determines said preload from rotational vibrations of said bearing.

9. A method of claim 7, wherein said preload measuring means determines said preload from rotational sound of said bearing.

10. A method of claim 7, wherein said preload measuring means determines said preload from a reaction to vibrations applied to said bearing.

11. A method of claim 7, wherein said preload measuring means determines said preload from a rotational torque of said bearing.

12. A method of claim 7, wherein said preload measuring means determines said preload from a load-displacement relationship between said first and second rotary units of said bearing.

13. A method for manufacturing a preload-adjustable bearing constructed of a first rotary unit and second rotary unit rotatable relative to each other, said first rotary unit having a first race and second race arranged immobile in a direction approaching toward each other, said second rotary unit having a third race and fourth race, said third race being located opposite said first race of said first rotary unit with a first row of balls interposed there between, said fourth race being located opposite said second race of said first rotary unit with a second row of balls interposed therebetween, said third race being immobile relative to said second rotary unit in a direction away from said fourth race, said fourth race being fitted with said second rotary unit with an interference formed therebetween movably relative to said second rotary unit, and said fourth race being movable toward said third race under pressure along a central axis of the bearing applied between said fourth race and said second rotary unit, which method comprises:

forming at least one race groove in said fourth race subsequent to the fitting of said fourth race with said second rotary unit.

14. A method for manufacturing a preload-adjustable bearing constructed of a first rotary unit and second rotary unit rotatable relative to each other, said first rotary unit having a first race and second race arranged immobile in a direction approaching toward each other, said second rotary unit having a third race and fourth race, said third race being located opposite said first race of said first rotary unit with a first row of balls interposed therebetween, said fourth race being located opposite said second race of said first rotary unit with a second row of balls interposed therebetween, said third race and fourth race being fitted with said second rotary unit with an interference formed therebetween movably relative to said second rotary unit, and said third race and said fourth race being movable toward each other under pressure along a central axis of the bearing applied between said third race and said fourth race, which method comprises:

forming at least one race groove in each of said third and fourth races subsequent to the fitting of said third and fourth races with said second rotary unit.

15. A method for setting the preload of a preload-adjustable bearing constructed of a first rotary unit and second rotary unit rotatable relative to each other, said first rotary unit having a first race and second race arranged immobile in a direction approaching toward each other, said second rotary unit having a third race and fourth race, said third race being located opposite said first race of said first rotary unit with a first row of balls interposed therebetween, said fourth race being located opposite said second race of said first rotary unit with a second row of balls interposed therebetween, said third race and fourth race being fitted with said second rotary unit with an interference formed therebetween movably relative to said second rotary unit, and said third race and said fourth race being movable toward each other under along a central axis of the bearing pressure applied between said third race and said fourth race, which method comprises:

applying pressure along a central axis of the bearing between said third race and said second rotary unit; and moving said third and fourth races toward each other while measuring by preload measuring means a preload between said first, second, third and fourth races and said first and second rows of balls;

whereby said preload is set at a predetermined value.

16. A method for setting the preload of a preload-adjustable bearing constructed of a first rotary unit and second rotary unit rotatable relative to each other, said first rotary unit having a first race and second race arranged immobile in a direction approaching toward each other, said second rotary unit having a third race and fourth race, said third race being located opposite said first race of said first rotary unit with a first row of balls interposed therebetween, said fourth race being located opposite said second race of said first rotary unit with a second row of balls interposed therebetween, said third race and fourth race being fitted with said second rotary unit with an interference formed therebetween movably relative to said second rotary unit, and said third race and said fourth race being movable toward each other under pressure along a central axis of the bearing applied between said third race and said fourth race, which method comprises:

applying pressure along a central axis of the bearing between said fourth race and said second rotary unit; and moving said third and force races toward each other while measuring by preload measuring means a preload between said first, second, third and fourth races and said first and second rows of balls;

whereby said preload is set at a predetermined value.

17. A method of claim 7, wherein the pressure along a central axis of the bearing is applied between said third race and said fourth race to move one of said third and fourth races toward the other.

* * * * *